United States Patent [19]

Johnson, Jr. et al.

[11] 4,419,115

[45] Dec. 6, 1983

[54] FABRICATION OF SINTERED HIGH-SILICA GLASSES

[75] Inventors: David W. Johnson, Jr., Pluckemin; John B. MacChesney, Lebanon; Eliezer M. Rabinovich, Summit, all of N.J.

[73] Assignee: Bell Telephone Laboratories, Incorporated, Murray Hill, N.J.

[21] Appl. No.: 288,788

[22] Filed: Jul. 31, 1981

[51] Int. Cl.$^3$ .................... C03B 37/01; C03B 19/06
[52] U.S. Cl. .................... 65/3.12; 65/3.11; 65/3.2; 65/18.1; 65/18.3; 501/12
[58] Field of Search .................... 65/3.11, 3.12, 3.2, 65/134, 18.1, 18.3, 18.4, 30.13, 17; 501/12, 54, 55, 63, 65; 264/62, 56

[56] References Cited

U.S. PATENT DOCUMENTS

| Re. 28,028 | 6/1974 | Maurer | 65/3 |
|---|---|---|---|
| 2,106,744 | 2/1938 | Hood et al. | 106/36.1 |
| 2,215,039 | 9/1940 | Hood et al. | 49/79 |
| 2,221,709 | 11/1940 | Hood et al. | 106/36.1 |
| 2,286,275 | 6/1942 | Hood et al. | 49/79 |
| 3,597,252 | 8/1971 | Schroder et al. | 501/12 |
| 3,640,093 | 2/1972 | Levene et al. | 65/134 |
| 3,759,683 | 9/1973 | Dislich et al. | 501/12 X |
| 4,042,361 | 8/1977 | Bihuniak et al. | 65/18 |
| 4,059,658 | 11/1977 | Shoup et al. | 264/43 |
| 4,217,027 | 8/1980 | MacChesney | 350/96.3 |
| 4,278,632 | 7/1981 | Yoldas et al. | 501/55 X |
| 4,317,668 | 3/1982 | Susa et al. | 501/12 X |
| 4,323,381 | 4/1982 | Matsuyama et al. | 501/12 X |
| 4,324,576 | 4/1982 | Matsuyama et al. | 65/3.11 X |

Primary Examiner—Kenneth M. Schor
Attorney, Agent, or Firm—Samuel H. Dworetsky

[57] ABSTRACT

High-silica glasses are formed by sintering a dried gel at temperatures below the liquidus. The gel may be formed by mixing colloidal silica particles or silica-containing liquids with appropriate liquids. Fragmentation of the gel during drying is advantageously avoided by redispersing the dried gel or sol in a liquid to yield a colloidal suspension which is then gelled, dried, and finally sintered below the liquidus.

21 Claims, 2 Drawing Figures

FABRICATION OF SINTERED HIGH-SILICA GLASSES

BACKGROUND OF THE INVENTION

1. Technical Field

This invention is a method of producing high-silica substantially alkali-free glasses and high-silica substantially alkali-free glass articles by sintering appropriate field gels below the liquidus.

2. Disclosures of Interest

High silica glasses have wide commercial application, in part, because of their refractory properties, low thermal expansion, high thermal shock resistance, good chemical resistance, and good dielectric and insulating properties when low in alkali-oxides. Recently, high silica glasses have been fabricated with very high purity and such glasses have been successfully applied to produce extremely low-loss optical fibers for communication systems.

High silica glasses are made primarily by either melting or sintering appropriate starting materials. Melting always occurs above the liquidus where the entire body becomes liquid and upon subsequent cooling forms a glass. Sintering generally occurs below the liquidus by viscous flow although the body substantially retaining its shape.

The range of materials available for glass processing by melting is, in one sense, broader than that available for processing by sintering. For example, crystalline solids may be melted to form glass bodies. However, crystalline materials cannot be sintered below the liquidus to a glass body. On the other hand, the formation of silica glass by melting presents significant difficulties in its own right. For example, the high viscosity of molten silica results in a tendency for the molten silica to contain entrapped bubbles which leads to imperfections in the resultant glass. Furthermore, silica must be raised to approximately 2000 degrees to become molten and at that temperature significant evaporation tends to occur. Furthermore, refractory bodies to contain the molten silica at these high temperatures are not readily available.

Applications of glass formation by sintering, well known to those skilled in the art, include sintering milled cullet of previously melted glass, such as in the fabrication of frits, enamels, solder glasses, and slipcast fused silica, the latter particularly useful for electromagnetic windows. Additionally, glass may be formed by sintering particles of amorphous silica which have not been melted, such as, for example, in various optical fiber fabricating techniques, see, for example, U.S. Pat. Nos. 4,217,027 and Re. 28,028.

In U.S. Pat. No. 4,059,658 there is disclosed a technique for forming glass by sintering an appropriately dried gel. The technique, however, requires the use of alkali-containing materials in order to obtain an appropriate gel. Additionally, subsequent leaching steps are used in order to successfully sinter the dried gel without cracking, as well as perhaps to remove undesirable constituents.

In U.S. Pat. No. 4,042,361 there is disclosed a method of densifying a fumed metal oxide which involves drying a flowable sol of metal oxide to form a fragmented solid which is then calcined. The calcined oxide is milled to provide a slip for casting silica articles which are then fused by heating to temperatures above the liquidus.

SUMMARY OF THE INVENTION

This invention is a method of forming high-silica, substantially alkali-free glass by sintering an appropriate substantially alkali-free starting material at temperatures below the liquidus, i.e., the highest temperature for which there may exist a crystal phase in equilibrium with the liquid phase for the particular composition. The starting material is generally obtained without melting and may be derived, for example, from an appropriately high silica gel which is dried and then sintered at temperatures below the liquidus. The sintering may occur in air, or in the presence of other gases, such as helium, which results in more efficient removal of pores or seeds from the material, and/or halogens, such as chlorine, to remove vestiges of water. Leaching is not necessary either to obtain effective sintering or to remove undesirable constituents.

The gel, which is dried and then sintered to form the glass, may be obtained by mixing fumed silica with an appropriate liquid, usually polar, or by mixing appropriate liquids, such as, e.g., silicon tetrachloride, and water. Dopants may be added, e.g., in the form of appropriate liquids, such as boric acid solutions, either prior to formation of the gel, or by exposing the gel, either prior to or after drying, to a dopant-containing liquid.

Applicants have found that the possibility of cracking, a prevalent problem in the prior art, may be significantly reduced by redispersing the dried first gel in an appropriate liquid and forming a second gel which is then dried and sintered. Using this technique, the cracking problems are essentially eliminated.

Sintering characteristics are significantly improved when the dried first gel or sol is raised to a temperature less than 1150 degrees Celsius and then redispersed to form the second gel.

While the invention, in its broadest sense, is a method of forming monolithic high-silica glasses, specific embodiments will involve the formation of molded glass bodies. In such embodiments, appropriate materials are gelled in specific molds and then removed and appropriately processed to yield the desired shaped glass body. Optical fiber preforms from which optical fibers are drawn may be thereby formed.

DETAILED DESCRIPTION

Figure 1:
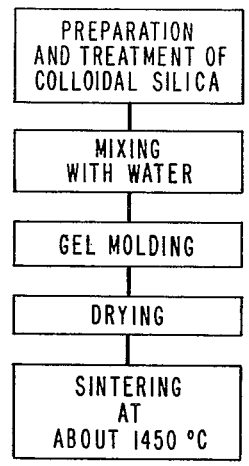
FIG. 1 is a schematic representation of representative steps which may be practiced in carrying out an embodiment of this invention.

The invention is a method of producing high-silica, substantially alkali-free glasses by sintering appropriate starting materials at a temperature below the liquidus. Glasses produced using this technique will generally have a silica content greater than 50 or 70 percent and in many embodiments greater than 90 or 96 percent. The technique does not involve the use of alkali-containing starting materials and this technique is thereby distinguished from other techniques which involve the use of alkali-containing starting materials, or which yield glasses with relatively high alkali content. This technique, on the other hand, may very well yield glasses with less than 50 ppm or even 5 ppm alkali oxide.

The inventive technique in various embodiments involves the sintering of a dried first gel and the possible redispersion of the dried first gel in a liquid to form a second gel which may then be sintered at temperatures below the liquidus.

Elements of various embodiments will be discussed below.

I. Sintering of a Dried First Gel

The invention involves the sintering of an appropriate material at temperatures below the liquidus to obtain a high-silica, substantially alkali-free glass. An appropriate material for sintering is a dried first gel (to be distinguished later from a possible second gel) formed by any one of a number of techniques to be discussed below. In the context of this application the term "gel" refers to a non-rigid, coherent state of matter capable of maintaining a particular shape. The gel is generally dried prior to sintering in order to remove volatiles which would expand upon sintering and disrupt the body. In certain embodiments, entrained gases may become trapped within the glass during the sintering process. To avoid this, the sintering may occur under vacuum and/or the sintering environment may include gases, such as helium, which facilitate removal of the entrapped gas during sintering. Halogens, such as chlorine, may be added to the sintering environment to remove residual water and hydroxyl ions from the material as it sinters.

II. Formation of the First Gel

While the material which is sintered below the liquidus in this invention may be formed by any one of a number of techniques, it is found particularly appropriate to form the material by gel techniques. Appropriate silica gels may be formed by mixing fumed silica, such as silica particles formed by flame hydrolysis, with a liquid, usually polar, such as water. The fumed silica is slowly added to the water while mixing, and a colloidal suspension, or sol, of fumed silica in water is obtained. The application of a slight vacuum on the order of magnitude of 0.1 to 10 millimeters of mercury will discourage the formation of entrapped gases which deleteriously affect subsequent sintering.

Previous gel techniques involving other materials have been found to be highly pH dependent. However, the simple mixture of fumed silica with water results in relatively rapid gelling without any adjustment of the pH.

With time the colloidal suspension of silica in water gels. The gel process is not dependent on the evaporation of water and in some embodiments it is preferable to gel the suspension in an enclosed container, thereby avoiding water evaporation. The evaporation of water is preferably avoided during gelling so as to minimize the possibility of cracking. Subsequent to gelling, the gel may be exposed to the atmosphere and allowed to dry with or without the application of heat.

Appropriate colloidal suspensions may also be formed by mixing two or more liquids together. For example, silicon tetrachloride when mixed with water in the proper proportion results in a chemical reaction and the formation of a colloidal suspension which may then be gelled and dried in a manner similar to that described above.

The drying of the gel may advantageously occur in a controlled humidity environment when cracking is of concern.

If a doped silica glass is desired appropriate materials may be added during the formation of the colloidal suspension in order to yield appropriate doped silica. For example, boric acid and/or phosphoric acid solutions may be added to the liquid, or used as part of the liquid, in the formation of the colloidal suspension. Additionally other more reactive dopant-containing-materials such as germanium tetrachloride may be slowly added to yield appropriately doped glasses.

III. The Two-Step Process

While the gel may be dried without cracking in a controlled moisture environment subsequent to sintering, it is found beneficial to form the gel by a two-step process which minimizes the possibility of cracking even without the use of a moisture controlled environment. In the two-step process the dried first gel or sol discussed above is redispersed in an appropriate liquid such as water to yield a colloidal suspension which is then again gelled and dried as described above. In this process the physical integrity of the dried first gel is of little consequence and therefore cracking during drying of the first gel is of little concern. The second gel dries with less than 5 percent linear shrinkage and consequently does not crack. During the redispersion of the dried first gel or sol to form a colloidal suspension a slight vacuum may be once again applied, as above, to remove entrained gases and therefore to obtain ultimately a more uniformly sintered material.

In order to improve sintering characteristics in the two-step process it is found advantageous to raise the dried first gel or sol to a temperature less than 1150 degrees Celsius and usually in the vicinity of 750 to 850 degrees Celsius. Subsequent to such treatment the dried first gel is cooled, and redispersed in a liquid, perhaps under an optional vacuum, as described above, to yield a colloidal suspension which is then gelled and dried prior to sintering below the liquidus. Such thermal treatment is found to result in improved sintering.

Significant compacting of the material processed using the inventive technique occurs during mixing of the fumed silica and during drying of the first gel. However, the BET surface area of the material remains essentially unchanged to within experimental error (approximately $\pm 15$ percent) throughout formation and drying of the gels, and indicated heat treatment of the first gel, showing that densification through sintering does not occur until the final sintering step.

IV. Molding

Embodiments of the invention which involve formation of a gel, subsequent drying, and sintering below the liquidus, may be used in a gel molding procedure to obtain formed bodies of specific configuration. In these embodiments, it is found particularly advantageous to place the colloidal suspension in a mold of appropriate shape which is then closed allowing the colloidal suspension to gel without the loss of water. Such processing minimizes the possibility of cracking which is particularly prevalent when gelling occurs simultaneously with nonuniform drying, i.e., in an open mold. Subsequent to gelling the formed material may be released from the mold, dried, and ultimately sintered to a glass. Lower sintering temperatures may be required when formed bodies are fabricated in order to avoid distortion due to lowered viscosity of the material during sintering. When the two-step process described above is used, the first colloidal suspension may be allowed to gel in an open beaker, and the second colloidal suspension is gelled in an appropriate mold. The steps in such an embodiment of the invention are shown schematically in FIG. 1.

V. Doping

In certain specific embodiments it is desirable to form doped silica glasses. The inventive process is amenable to the formation of such glasses by introducing appropriate dopant-containing materials during any one of a number of steps encountered in the inventive process. For example, appropriate dopant-containing materials may be added during formation of the first colloidal suspension, or of the second colloidal suspension, or alternatively the gelled material may be immersed in an appropriate dopant-containing solution either previous to, or after, drying. Dopants may be added in any quantity, although it is generally anticipated that dopant quantities will be limited to approximately 30 percent. To the extent that the invention is limited to sintering below the liquidus, and since the liquidus will vary with dopant concentration, the amount of dopant added will determine the maximum sintering temperature.

Suggested dopants may include, although are not limited to, $B_2O_3$, $P_2O_5$ and $GeO_2$. These may be introduced as boric acid solutions, phosphoric acid solutions, germanium tetrachloride and other liquids or soluble compounds of appropriate metals.

VI. Specific Applications

Applications of this invention include the fabrication of formed articles such as, for example, high-silica tubes and rods, and electromagnetic windows such as radomes. For this latter application a nontransparent body of higher than 95 percent silica and with a bulk density as high as about 97 percent of theoretical density may be produced without crystallization by sintering at temperatures as low as 1250 degrees Celsius. Specific embodiments involve the formation of silica, or doped silica, rods and tubes which may then be used to form optical fiber preforms from which optical fibers are drawn. In such embodiments the silica may be doped with up to or greater than 50 percent dopant as required by engineering considerations associated with the design of the optical fiber.

In the formation of tubes it is found particularly desirable to first fire the tube to approximately 1250 degrees Celsius where sintering occurs to about 97 percent of theoretical without deformation, and then to fill the resulting tube with sand or other powder or material and fire the tube at higher temperatures to complete sintering. Only little shrinkage occurs above about 1200 degrees Celsius and the filling within the tube acts to improve dimensional uniformity without affecting the physical integrity of the tube. Alternatively, sintering the tube while hanging in a vertical kiln may result in improved dimensional characteristics and fire-polished appearance of the tube surfaces without the use of a filling material.

Figure 2:
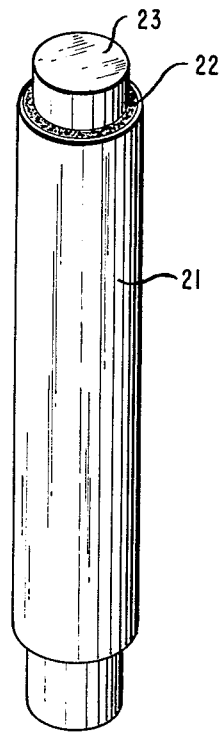
FIG. 2 is a schematic representation of one step in an embodiment of the invention, addressed to the formation of shaped bodies which may be used in the fabrication of optical fibers.

Optical fiber preforms may be made in their entirety using the inventive process by, for example, first forming a tube of gel or glsss using this process, and then filling the interior of the tube with another gel which will yield a glass of slightly higher index of refraction. Upon sintering a step index preform is obtained. Alternatively, as shown in FIG. 2, a cylindrical molding rod, 23, may be placed within the tube, 21, prior to placement of another gel, 22, thereby yielding an annular region of a second type of glass. In a similar manner, numerous annular regions may be formed to yield a graded index optical preform.

EXAMPLE 1

Fumed silica, with a surface area of about 200 square meters per gram, and a bulk density lower than 0.05 gm/cc, was mixed with deionized water at a ratio of 160 grams silica to 396 grams of deionized water. The fumed silica was obtained from the Cabot Corporation which markets it under the trade name cab-o-sil.

Deionized water was placed in a high shear Waring blender, and cab-o-sil was gradually added to the water while mixing at a speed of 5000 to 10,000 rpm; the addition and mixing required about 10 minutes. Subsequent to mixing, a flowable sol was obtained. The sol was poured into a beaker which was then evacuated to approximately 1 millimeter Hg for about 3 minutes to remove entrained air bubbles.

The material was dried in the beaker for about 2 days at between 90–150 degrees Celsius with gelling occurring during this drying. The dried material was then placed in a fused silica container and raised to 800 degrees Celsius over the course of an hour and was held at 800 degrees Celsius for 1 hour.

The heat treatment at 800 degrees Celsius results in loss of approximately 1 percent of weight due to removal of residual water. Spectral studies show, however, that some $OH^-$ groups remain. The resultant material is fragmented, with bulk density much higher than that of the original cab-o-sil (approximately 25 percent of theoretical density of silica), but retains the approximate BET surface area of the original cab-o-sil, i.e., about 200 square meters per gram.

Without additional milling, the above-discussed fragments of silica were then mixed with deionized water in the same high shear blender at a ratio of 90 grams of silica to 132 grams of deionized water. The material breaks up completely in 5 to 10 minutes but mixing is maintained for approximately 2–5 more minutes. During the final minute of mixing the material is evacuated to 1 millimeter Hg. The material remains pourable for 5–15 minutes before the onset of gelling, when the material becomes highly viscous preventing efficient removal of entrained air. Consequently, vacuum treatment during the mixing step is most beneficial in that voids due to entrained air are removed. These, if present, cause bubbles in the final glass. However, mixing must be stopped before the air is readmitted to prevent reintroduction of bubbles.

The pourable material is placed in an appropriate mold, which may be a glass tube with or without a central rod, and is allowed to gel at room temperature over a period of about 2 hours. Rubber stoppers prevent evaporation of water. The molded gel is then pushed out and allowed to dry on a table at room temperature for one day and is then placed in an oven at between 95–150 degrees Celsius for about 12 hours. Subsequently, the material was raised to 600 degrees Celsius over a period of 17 hours. The dried article is then cooled.

The dried molded article is then sintered by raising its temperature to 1460 degrees at a rate of about 400 degrees per hour until 1000 degrees Celsius is reached and at a rate of 200 degrees Celsius per hour above 1000 degrees Celsius. The material is held at 1460 degrees for about 90 minutes. (Intermediate soaking at 1000 degrees Celsius has, on subsequent occasions, improved sintering.) During the overall heat treatment a furnace atmosphere of 97 percent helium and 3 percent chlorine is provided.

Sintered transparent silica obtained in this example, exhibits the following properties: bulk density 2.20 grams per cm$^3$ (99.6 percent of theoretical density, i.e., the handbook value for pure fused silica); refractive index measured at 0.5893 microns—1.4588; linear coefficient of thermal expansion (25 to 700 degrees Celsius)—equal to that of the fused silica parts of the dilatometer used; modulus of rupture—69±21 MPa remaining essentially unchanged (64±14 MPa) after sand blasting showing that the relatively low value is attributed to surface conditions. (Firings were made in sand which could abrade the surface.) The modulus of rupture was measured using an Instron machine with 3-point loading, a 2.54 centimeter span, and a cross-head speed of 0.13 centimeters per minute. The rod diameters were 0.6 to 0.7 centimeters and 6 to 11 specimens were included in each test. The data limits were calculated for a 95 percent confidence level. The modulus of rupture of industrial fused silica rods tested by the same technique was 131±21 MPa as received, and 78±4.5 MPa sand blasted.

EXAMPLE 2

In this example the steps of Example 1 were substantially followed with the exception that the first colloidal suspension was formed by mixing 160 grams of Cab-o-sil with 398.8 grams of a 2.2 percent water solution of boric acid, providing 390 grams of water and 8.8 g H$_3$BO$_3$ equivalent to 3 weight percent content of B$_2$O$_3$. The resulting glass is similar to that obtained using the Vycor ® process of Corning glass work as described, for example, in U.S. Pat. Nos. 2,106,744; 2,215,039; 2,221,709 and 2,286,275. This technique, however, is less complicated, from a technological point of view, and furthermore results in a glass which is substantially free of alkali oxides.

The gelling rate for the colloidal suspension obtained in this example is significantly slower than the gelling rate for the colloidal suspension obtained in Example 1. However, when the two-step process is used, the gelling rate of the first colloidal suspension is not very critical, and the suspension may be dried directly in an oven with little concern for the gelling phenomenon and the rate of gelling. It is, however, desirable to accelerate the gelling of the second suspension, for example, as disclosed in the following example.

EXAMPLE 3

In this example the steps of Example 1 were substantially followed with the exception that the second colloidal suspension was formed by mixing 90 gms of the previously treated silica with 134.9 g of a 3.7 percent water solution of boric acid, providing 130 g water and 4.9 grams H$_3$BO$_3$, equivalent to a 3 weight percent content of B$_2$O$_3$. The resulting glass is again similar to Vycor. In order to increase the gelling rate sharply reduced by the boric acid additions, 40 drops (about 2 g) of concentrated HCl were added to the second colloidal suspension during mixing. Alternatively, citric acid or other acids may be used to restore the gelling rate or the material may be heated during the gelling process. It was found that a colloidal suspension comprising boric acid solution which did not gel over the period of a week at room temperature, could be gelled over a period of 2 to 3 days by maintaining it at 50 degrees Celsius, or over a period of 1½ hours by maintaining it at 85 degrees Celsius.

It is interesting to note that although a boric acid solution decreases the pH of the colloidal suspension it lowers the gelling rate. However, further decrease in pH is found to increase the gelling rate.

Sintered transparent 97 weight percent SiO$_2$-3 weight percent B$_2$O$_3$ glass as fabricated in this example has the following properties: bulk density—2.18 to 2.19 grams per cm$^3$; refractive index at 0.5893 microns—1.4555; linear coefficient of thermal expansion (25 to 700 degrees Celsius)—greater by 3×10$^{-7}$/degrees Celsius than the fused silica parts of the dilatometer used; modulus of rupture—130±33 MPa as fired and 99±4.5 MPa sand blasted. The strength of this glass is no lower than that of fused silica (see data in Example 1).

EXAMPLE 4

In this example the steps of Example 1 were substantially repeated with the exception that the molded gel, after drying, was inserted in a 4½ percent aqueous solution of boric acid for about 1 hour. The boric acid solution penetrates the dry gel to yield ultimately a boron doped silica glass. To improve penetration of the solution into the porous body a container with the solution and the immersed body may be placed in a vacuum of about 1 mm Hg for a period of a few minutes. The impregnation process may be repeated a number of times to increase boron oxide content. A single impregnation step results in a boron oxide content of about 3 weight percent with a resulting glass similar to that described in Examples 2 and 3. After impregnation, the body is dried again and then sintered at 1450 degrees Celsius.

EXAMPLES 5-8

The steps of Examples 1 through 4 were substantially reproduced except for the sintering step, which in this example was carried out at between 1250 and 1270 degrees Celsius. Nontransparent materials were obtained with a bulk density about 98 percent of theoretical density and a modulus of rupture of up to 71±16 MPa for the case of boron doped glass, and 22±4 for the case of pure silica glass.

EXAMPLE 9

In this example the first suspension was obtained by slowly mixing 340 grams of silicon tetrachloride with 410 grams of deionized water in a fumed hood to carry away HCl vapor formed. The remaining steps of the process were carried out as in Example 1.

EXAMPLE 10

In this example the technique of Example 9 was substantially followed except for the fact that the silicon tetrachloride was added to 416.6 grams of a 1.6 percent water solution of boric acid instead of to the pure deionized water.

EXAMPLE 11

In this example the steps of Example 9 were substantially followed except that the first suspension was formed by mixing a 751 grams of the silicon tetrachloride and 29.3 grams of germanium tetrachloride and then slowly adding this mixture to 300 grams of water.

EXAMPLE 12

In this example the steps of Example 1 were substantially followed except that during formation of the first suspension 17 g of $GeCl_4$ were slowly added, while mixing, providing 5 weight percent of $GeO_2$.

EXAMPLE 13

In this example the steps of Example 3 were substantially followed except that the second suspension was formed by mixing 92 grams of the dried first gel with 13 g of a 85 percent water solution of $H_3PO_4$, equivalent to 8 weight percent $P_2O_5$, and 133 g of deionized water. It was not necessary to accelerate gelling in this case by acid additions or heating.

EXAMPLE 14

In this example the steps of Example 3 were substantially followed except that the second suspension was formed by mixing 94 grams of the treated silica with 118.2 g of a 4.5 percent aqueous solution of boric acid, 4.9 g of an 85 percent $H_3PO_4$ solution 22.2 g of deionized water and 40 drops of HCl, providing 3 weight percent $B_2O_3$ and 3 weight percent $P_2O_5$.

EXAMPLE 15

In this example the steps of Example 4 were substantially followed except that the molded gel was dipped into a water-glycerine solution of boric acid. High viscosity of this solution, depending on the glycerine content, inhibits its penetration into the porous body resulting in a graded distribution of boron oxide in the resulting glass.

What is claimed is:

1. A method of fabricating a high-silica glass comprising;
   (a) forming a substantially alkali-free first sol of particles in a liquid, the particles comprising silica;
   (b) gelling the first sol to form a first gel;
   (c) drying substantially the first gel, to form a dried first gel;
   (d) forming particles from the dried first gel;
   (e) forming a substantially alkali-free second sol of particles in a liquid, by dispersing the previously prepared, substantially alkali-free particles provided in step (d) in a liquid;
   (f) gelling the second sol to form a second gel;
   (g) drying substantially the second gel; and
   (h) sintering the dried second gel to a glass at a temperature below the liquidus for the glass.

2. The method of claim 1 wherein the first gel is heated to a temperature less than 1150 degrees Celsius prior to particle formation.

3. The method of claim 3 wherein the first or second gel is heated to between 750 degrees Celsius and 800 degrees Celsius.

4. The method of claims 1, 2 or 3 wherein the first sol is formed by mixing fumed silica with the liquid.

5. The method of claim 5 wherein a boron doped glass is obtained by adding boron to the liquid in the form of a boron-containing solution.

6. The method of claim 5 wherein a boric acid solution is added during formation of the first or second sol or gel.

7. The method of claim 5 wherein a boric acid solution is added by dipping the second gel in a boric acid solution.

8. The method of claims 1 or 2 wherein the first or second sol is exposed to a pressure less than atmospheric pressure during formation.

9. The method of claim 1 wherein the second sol is gelled in a mold to yield ultimately a shaped glass.

10. The method of claim 5 wherein the boron-containing solution is an aqueous, glycerine, or water-glycerine solution of boric acid.

11. The method of claim 1 wherein a dopant is added during formation of the first or second sol or by impregnation of the first or second gel.

12. The method of claim 11 wherein the dopant is phosphorus oxide or germanium oxide, added as their liquid compouds or as solutions or their soluble compounds.

13. The method of claim 12 wherein the dopant is added by mixing germanium tetrachloride or phosphoric acid with the first or second sol.

14. The method of claim 1 wherein the first sol is formed by mixing silicon tetrachloride with water.

15. The method of claim 1 wherein the first sol is formed by mixing silicon tetrachloride, germanium tetrachloride and water.

16. The method of claims 14 or 15 wherein additional dopants containing materials are added to the first or second sol.

17. The method of claims 1 wherein the first or second gel is sintered at a temperature below 1300 degrees Celsius to obtain a nontransparent high-silica glass.

18. The method of claim 1 wherein a monolithic body is obtained by drying the first or second gel in a controlled humidity environment.

19. The method of claim 1 wherein an optical fiber is formed from the glass of step (b).

20. The method of claim 19 wherein the fiber is a step index or a graded index fiber.

21. The method of claim 20 wherein the second gel is formed into a layer and at least one such gelled layer is formed on the interior of a tubular structure.

* * * * *

UNITED STATES PATENT AND TRADEMARK OFFICE
CERTIFICATE OF CORRECTION

PATENT NO. : 4,419,115

DATED : December 6, 1983

INVENTOR(S) : David W. Johnson, Jr., John B. MacChesney and Eliezer M. Rabinovich It is certified that error appears in the above—identified patent and that said Letters Patent is hereby corrected as shown below:

Column 1, line 10, "field" should read --dried--; line 32, "melted" should read --melted--; line 33, "sintered" should read --sintered--. Column 10, line 1 "claim 3" should read --claim 2--; line 6 "claim 5" should read --claim 4--; line 28 "compouds" should read --compounds--; line 41 "claims" should read --claim--; line 48 "step (b)" should read --step (h)--.

Signed and Sealed this

Nineteenth Day of March 1985

[SEAL]

Attest:

DONALD J. QUIGG

Attesting Officer     Acting Commissioner of Patents and Trademarks